United States Patent [19]

Sildve

[11] 4,324,148
[45] Apr. 13, 1982

[54] ROTARY/LINEAR MOTION CONVERTER ASSEMBLY (BOWSTRING)

[75] Inventor: Ants Sildve, Lansdale, Pa.
[73] Assignee: Teleflex Incorporated, Limerick, Pa.
[21] Appl. No.: 151,179
[22] Filed: May 19, 1980
[51] Int. Cl.³ .................... F16H 21/44; F16H 25/18
[52] U.S. Cl. .................................................... 74/108
[58] Field of Search ............... 74/89.2, 89.21, 89.22, 74/108

[56] References Cited

U.S. PATENT DOCUMENTS

| | | | |
|---|---|---|---|
| 173,457 | 2/1876 | Glendillen | 74/108 |
| 696,624 | 4/1902 | Buck | 74/108 |
| 1,160,368 | 11/1915 | Bozell, et al. | 74/108 |
| 2,233,248 | 2/1941 | Douglas | 74/108 |
| 3,021,721 | 2/1962 | Hooven | 74/496 |

FOREIGN PATENT DOCUMENTS 772526  10/1934  France .......................... 74/108

Primary Examiner—Lawrence J. Staab
Attorney, Agent, or Firm—McGlynn and Milton

[57] ABSTRACT

A rotary/linear motion converter assembly of the type for converting rotational motion to longitudinal motion for longitudinally moving a motion transmitting core element and vice versa, to transmit motion. The assembly includes a sector member having a pair of parallel peripheral grooves therein rotatably supported in a housing with the housing also reciprocally supporting a slider tube with one end of the slider tube adapted for connection to a motion transmitting core element. A pair of cables are attached to the sector member and wrapped about the sector member in the respective grooves with the opposite ends attached to the opposite ends of the slider tube. The cables are preloaded in tension under a force which is greater than the force to be transmitted by the motion transmitting core element so that upon rotation of the sector member, the cables wrap and unwrap in the groove thereof while reciprocating the slider member without lost motion between the sector member and the slider member, i.e., there is no backlash in the actuator.

12 Claims, 4 Drawing Figures

ROTARY/LINEAR MOTION CONVERTER ASSEMBLY (BOWSTRING)

BACKGROUND OF THE INVENTION (1) Field of the Invention

This invention relates to a rotary/linear motion converter or actuator assembly of the type for longitudinally moving a flexible motion transmitting core element to transmit motion in a curved path, or vice versa. One example of such an actuator is one utilized in the throttle system for a jet engine of an aircraft wherein motion must be remotely transmitted between the throttle control and the pilot, and in such transmission there is a requirement for conversion between rotary and linear motion.

(2) Description of the Prior Art

There are various known actuators for making a conversion between rotary and linear motion. Many convert rotary motion to linear motion for moving a motion transmitting core element slidably supported in a conduit. Such assemblies include a motion transmitting core element and a rotating member with an operating connection between the two for longitudinally moving the core element upon rotation of the rotatable member. In such systems it is desirable that upon rotation of the rotatable member there be a corresponding exact longitudinal movement of the core element; however, there is a problem of lost motion between the rotatable member and the core element which is also referred to as backlash. This occurs because of manufacturing tolerances and/or wear. These same problems occur in assemblies where linear motion is converted to rotary motion.

SUMMARY OF THE INVENTION

A rotary/linear motion converter assembly of the type converting rotational motion to longitudinal motion for longitudinally moving a motion transmitting core element, and vice versa, to transmit motion. The assembly comprises sector means rotatable about a rotational axis with slider means reciprocal along a reciprocation axis which is transverse to the rotational axis and housing means rotatably supporting the sector means and reciprocally supporting the slider means. The system is characterized by tensioning means in tension between and interconnecting the sector means and the slider means to move the slider means along the reciprocal axis in response to rotation of the sector means for preventing lost motion between the sector means and the slider means.

PRIOR ART STATEMENT

Typical of the prior art rotary actuator assemblies is one including a circular gear-like member having a peripheral groove for receiving the core element. The core element comprises a plurality of wires stranded together on a long lead with a helical wire wound thereabout on a short lead for coacting with spaced recesses in the peripheral groove of the circular gear member. An example of such an assembly is shown in U.S. Pat. No. 3,766,801 granted Oct. 23, 1973 to Hans Wiegand and assigned to the assignee of the subject invention. That system is excellent for certain operating environments such as marine steering where backlash relative to high efficiency losses are tolerable but is not satisfactory in precision environments such as high performance aircraft controls.

As stated above, the subject invention utilizes tension means between a slider means and a sector means to prevent lost motion between the two. There are known in the prior art various tensioning means including cable tension means such as those disclosed in U.S. Pat. No. Re. 23,933 which reissued Feb. 1, 1955 from original U.S. Pat. No. 2,581,080 granted Jan. 1, 1952 in the name of Clifford E. Cushman. However, none of the prior art suggests solving the problem of lost motion in a rotary/linear motion converter or actuator by including a tensioning means between a slider means and a sector means.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
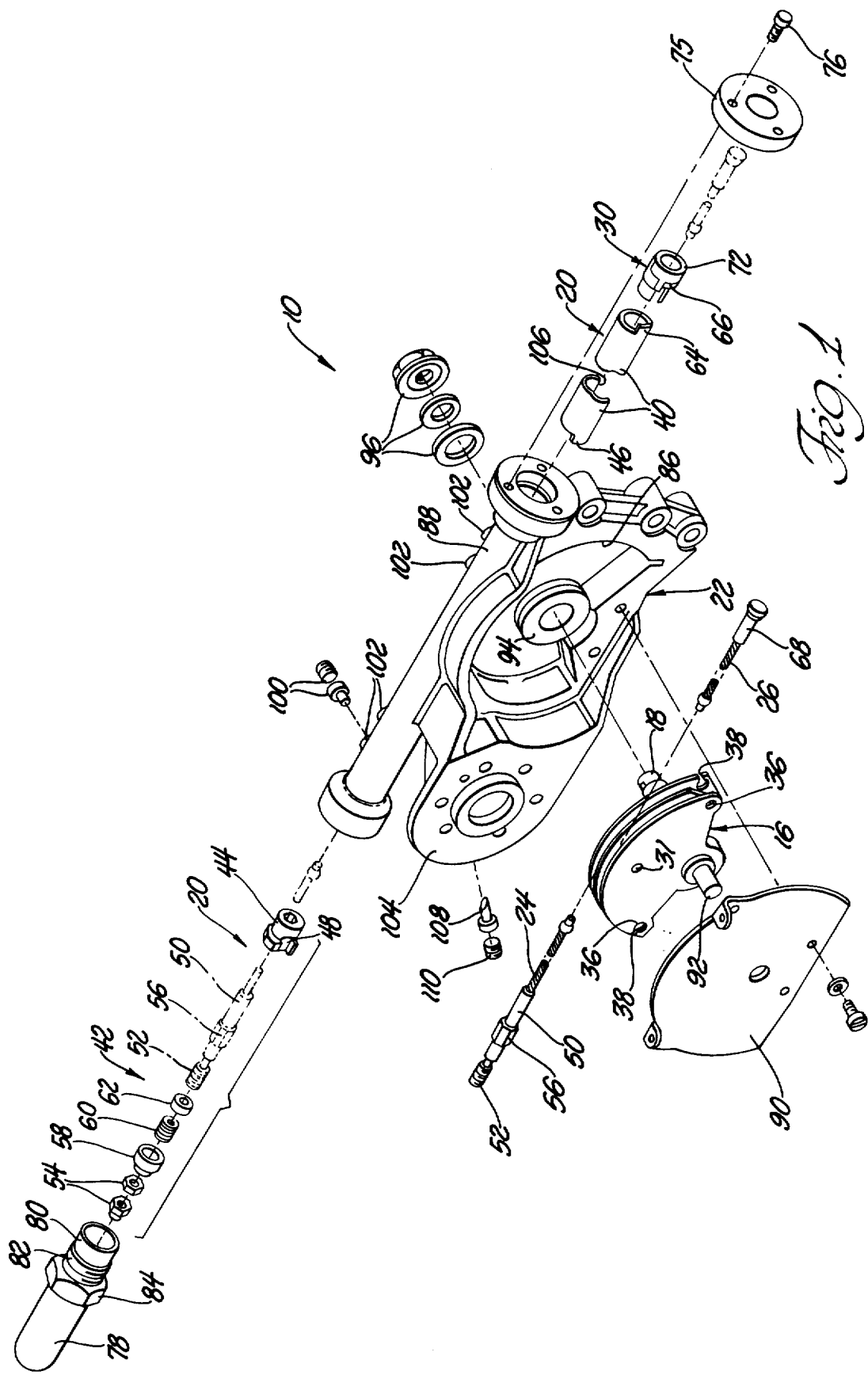
FIG. 1 is an exploded perspective view of a preferred embodiment of the subject invention.
Figure 2:
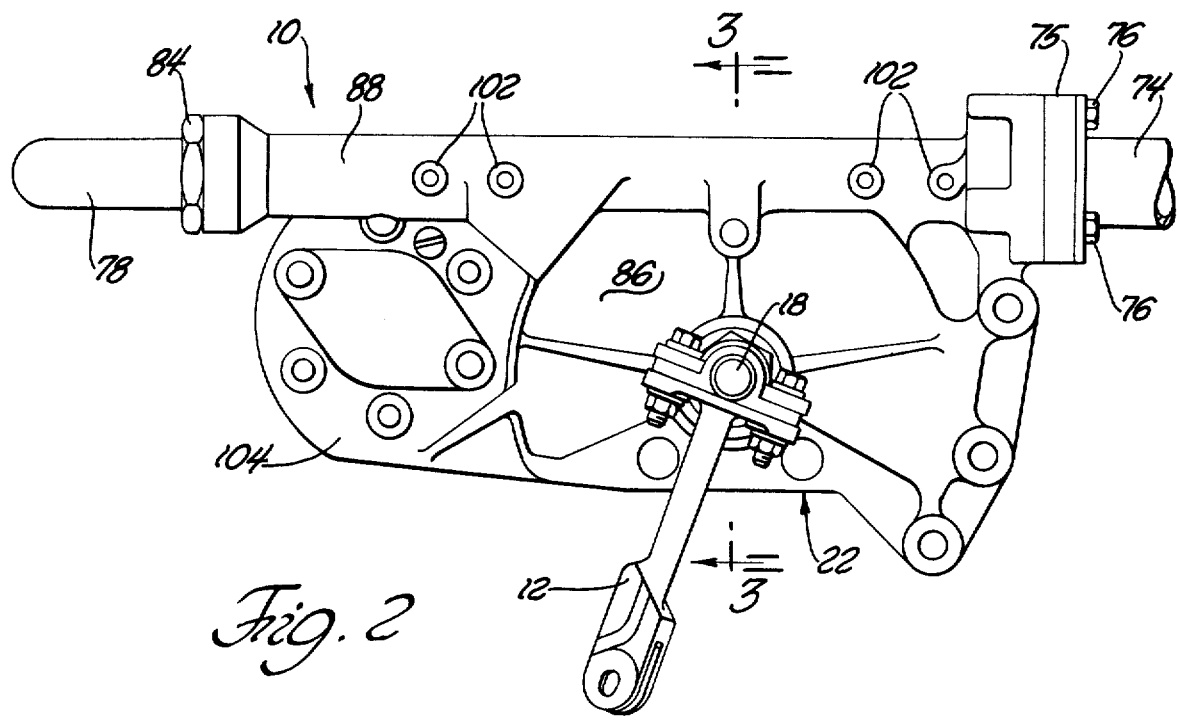
FIG. 2 is a side elevational view of the preferred embodiment.

A rotary/linear motion converter or actuator assembly of the type converting rotational motion to longitudinal motion for longitudinally moving a flexible motion transmitting core element to transmit motion along a curved path is generally shown at 10. The rotary input motion may be by way of a lever 12 with the assembly converting the rotary input motion to longitudinal movement of a core element 14. The core element 14 is typically supported in a conduit for longitudinal movement and comprises a plurality of wires wound together on a long lead with a helically disposed wire thereabout on a short lead. It will be appreciated that the converter 10 may convert rotary motion to linear motion of the core element 14 or convert linear motion of the core element 14 to rotary output motion of the assembly 10. Further, as is well known in the art, the conduit in which the core element 14 is slidably supported may be flexible or rigid.

The actuator assembly 10 includes a sector means comprising the sector member or pulley generally indicated at 16 and rotatable about a rotational axis defined by an integral shaft extending therefrom to a distal end to which the lever 12 is attached for rotating the shaft and therefore the sector means or pulley 16.

The assembly 10 also includes slider means generally shown and indicated at 20 reciprocal along a reciprocation axis which is transverse to the rotational axis of the shaft 18.

Also included is a housing means generally indicated at 22 for rotatably supporting the sector pulley 16 as the shaft 18 is rotatably supported by the housing means. The housing means or housing 22 also reciprocally supports the slider means 20.

The assembly 10 includes tensioning means comprising the first and second flexible cables or ropes 24 and 26 in tension between and interconnecting the sector pulley 16 and the slider means 20 to move the slider means 20 along the reciprocal axis in response to rotation of the sector pulley 16 without lost motion between the sector pulley 16 and the slider means 20.

The slider means 20 includes first and second attachment means, generally indicated at 28 and 30 respectively, spaced along the reciprocation axis from one another. The first cable 24 is attached at a first end to the first attachment means 28 and the second cable 26 is attached at a first end to the second attachment means 30 for placing the slider means 20 in compression between the first and second attachment means 28 and 30.

Figure 3:
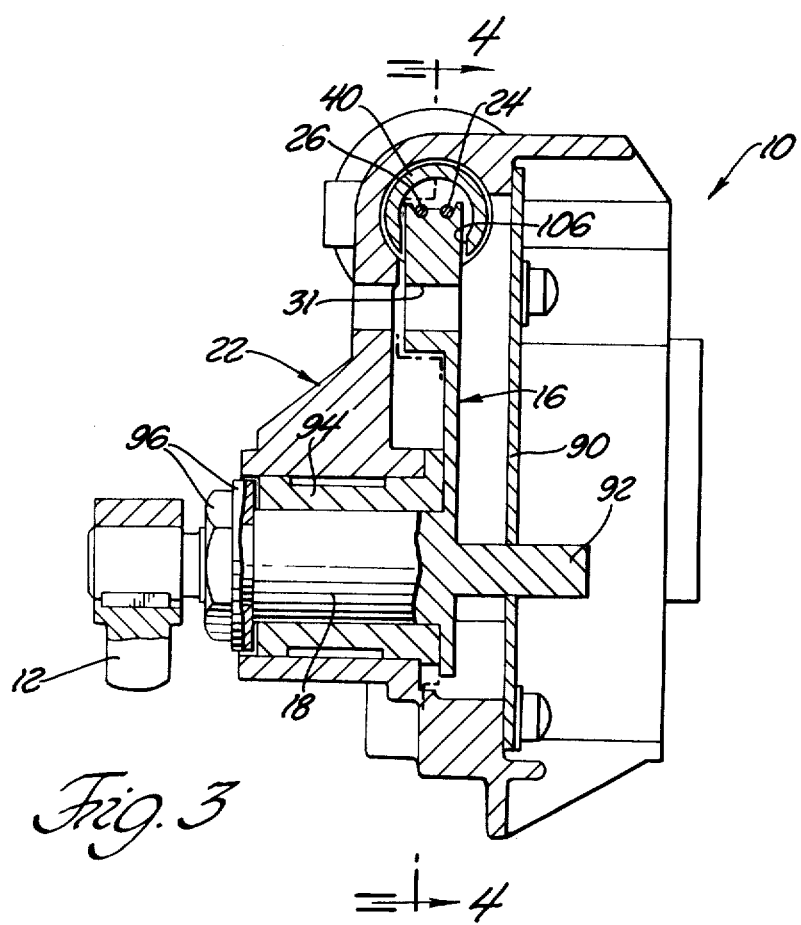
FIG. 3 is a fragmentary cross-sectional view taken substantially along line 3—3 of FIG. 2.
Figure 4:
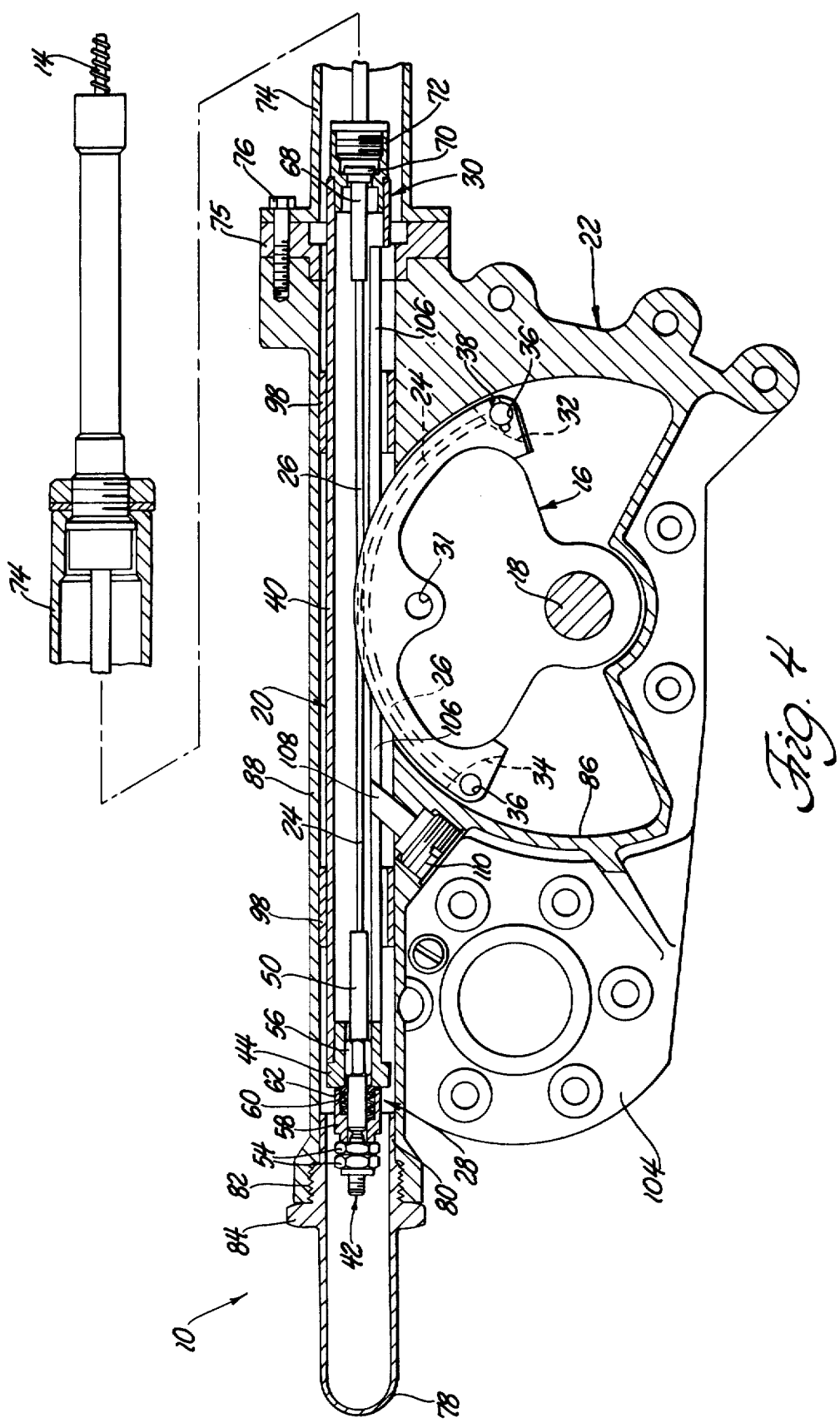
FIG. 4 is a cross-sectional view taken substantially along line 4—4 of FIG. 3.

The sector means or pulley 16 includes an arcuate periphery concentric with the rotational axis of the shaft 18. A pair of first and second spaced and parallel grooves extend along the arcuate periphery with the first cable 24 being disposed in the first groove for wrapping and unwrapping engagement with the first groove in the sector pulley 16 during rotation of the sector pulley 16 and the second cable 26 is disposed in the second groove for wrapping and unwrapping engagement with the second groove in the sector pulley 16 during rotation of the sector pulley 16. The sector pulley 16 has a rigging position, as shown in FIG. 4, with the slider means 20 being likewise in a rigging position, i.e., both the sector pulley 16 and the slider means 20 may move in opposite directions from the rigging position. The rigging position of the sector pulley 16 may be established by inserting an appropriate alignment tool through the respective alignment bores 31 in the sector pulley and the housing 22, as best illustrated in FIG. 3, to prevent rotation of the sector pulley 16 relative to the housing 22. The sector pulley 16 has a first attachment position comprising a first pocket 32 spaced along the periphery of the sector pulley 16 in a clockwise direction, as viewed in FIG. 4, from a central portion of its periphery and a second attachment position comprising a second pocket 34 spaced along the arcuate periphery of the sector pulley 16 in the opposite or clockwise direction from the central portion thereof. The grooves in the sector pulley 16 in which the cables 24 and 26 are disposed extend about the periphery of the sector pulley 16 between the first and second attachment positions defined by the pockets 32 and 34. The second end of the first cable 24 is attached to the sector pulley 16 at the pocket 32 and the second end of the second cable 26 is attached to the sector pulley 16 at the second pocket 34. Specifically, each of the pockets 32 and 34 are wider than the respective grooves in which the cables 24 and 26 are disposed. Each cable 24 and 26 has a ball swaged to the end thereof. The sector pulley 16 has bores 36 extending therethrough and each bore 36 has a slot 38 associated therewith but with the slots 38 being on opposite faces of the sector pulley 16. During assembly the end of the flexible cable 24 is disposed through the slot 38 and the ball swaged onto the end of the cable 24 is moved through the associated bore 36 into the pocket 32 in which it is retained because the ball is larger than the groove in which the flexible cable 24 is disposed. In a similar fashion, the cable 26 is placed in position, however, the ball moves through the bore 36 associated with the pocket 34 from the opposite side of the sector pulley 16.

The slider means includes a tubular member 40 with first and second ends, the first attachment means 28 being positioned at the first end of the tube 40 and the second attachment means 30 being positioned at the second end of the tube 40.

The first attachment means 28 includes adjustment means generally indicated at 42 for adjusting the tension in the first and second cables 24 and 26. The first attachment means 28 includes a first adapter 44 abutting the first end of the tubular member 40. The adapter 44 has a small diameter portion which is inserted into the tube 40 and an annular flange or shoulder portion abutting the end of the tube 40. The first end of the tubular member 40 includes a projection 46 which is disposed in a recess 48 in the flange portion of the adapter 44 for preventing relative rotation between the adapter 44 and the tube 40.

The adjustment means 42 interconnects the first end of the first cable 24 and the first adapter 44. The first adjustment means 28 includes a first terminal rigid shaft 50 attached to the first end of the first cable 24 as by swaging, or the like, and extending through the adapter 44. The adjustment means 42 includes a threaded portion 52 on the terminal shaft 50. The adjustment means also includes the nuts 54 threaded onto the threaded portion 52 for reacting with the adapter 44. The terminal shaft 50 includes an irregularly-shaped or hexagon-shaped portion 56 which coacts with an internal bore extending through the first adapter 44 which is also hexagonal in configuration for preventing rotation of the terminal shaft 50 upon the tightening of the nuts 54.

The adjustment means 42 further includes biasing means reacting between the first adapter 44 and the nuts 54 for pretensioning the cables 24 and 26 by urging the nuts 54 away from the first adapter 44. Specifically, a generally cup-shaped member 58 surrounds a group of Belleville springs 60 and a ring member 62 with the springs 60 forcing the ring member 62 against the end of the adapter 44. The springs 60 provide a known or predetermined force so that when the nuts 54 are threaded onto the terminal member 50, the spacing between the member 58 and the end of the adapter 44 is an indication of the amount of tension or force in the cables 24 and 26. The preloading or tension in the cables 24 and 26 is established such that it is greater than the normal tension or force to which the motion transmitting core element 14 would be subjected in the operating environment.

The second attachment means 30 includes a second adapter member with a small diameter portion inserted within the second end of the tubular member 40 and an enlarged annular portion presenting a flange or shoulder abutting the end of the tube 40 having a projection 64 for insertion into the recess 66 of the adapter for preventing relative rotation between the adapter and the tubular member 40. The first end of the second cable 26 includes a rigid terminal member 88 swaged or otherwise attached to the flexible cable 26 and having a head retained within the adapter by a flange 70. The second adapter also includes core element attachment means comprising the threaded portion 72 into which is threaded a terminal member for the motion transmitting core element 14. Thus, the second end of the slider means 20 includes a core element attachment means for connection to a motion transmitting core element 14.

The housing 22 is adapted for connection to a core element casing 74 adjacent the adapter (30) by an adapter member 75 and bolts 76. The bolts 76 threadedly engage the housing 22. The adapter 75 may take various configurations, as its function is to receive various different core element casings 74.

The opposite end of the housing includes a closed end spent travel tube 78 which is removably connected to the housing 22 for receiving the first end of the slider means 20 during movement thereof and, when removed, allows access to the slider means 20. Specifically, the tube 78 has a guide portion 80 which slides into the portion of the housing 22 surrounding the slider means 20 and a threaded portion 82 which threadedly engages the open end of the housing 22. The tube includes a nut-like portion 84 for attaching and removing the tube 78.

The housing 22 includes a circular portion 86 surrounding the sector pulley 16 and an integral tubular portion 88 extending generally tangentially to the circular portion 86 and surrounding the slider means 20. The circular portion 86 is open on one side and a cover means or plate 90 closes the open side. The plate 90 has a circular hole in the middle thereof and the sector pulley 16 includes an extension 92 extending therethrough, the extension 92 being utilized for a timing or indicating function. The shaft 18 of the sector pulley 16 is rotatably supported in a sleeve bearing 94 and is held in place by a nut and spacer assembly 96 with the nut portion threadedly engaging a threaded extension of the shaft 18.

The tubular portion 88 of the housing 22 supports a pair of spaced sleeve bearings 98 for surrounding the tubular member 40 for guiding the reciprocal movement of the tubular member 40. Four pin and threaded screw assemblies 100, only one of which is shown, are inserted into the bosses 102 so that the pins are disposed at either end of the sleeve bearings 98 for preventing movement of the sleeve bearings 98 along the tangential portion 88 of the housing. The flanged portion 104 of the housing 22 is shown as part of the preferred embodiment and is utilized in that embodiment for an interface with another system but is not necessary to any embodiment of the subject invention.

There is also provided a guide means for preventing rotation of the tubular member 40 about the reciprocation axis. Specifically, the guide means includes a slot 106 extending longitudinally along the tubular member 40 and a guide member 108 supported by the housing 22 and extending into the slot 106. The guide member 108 is like a pin having a diameter and two-spaced flat sides of the width of the slot 106 and locked into the housing 22 by a threaded cap-like member 110. It will also be noted that the arcuate periphery of the sector pulley 16 is disposed in the slot 106, as best illustrated in FIGS. 3 and 4.

As will be appreciated, when the adjustment means comprising the nuts 54 are tightened to compress the springs 60, a predetermined tension is placed upon the cables 24 and 26 and that tension should be more than the expected tension in the operation of the motion transmitting core element 14. As the sector pulley 16 is rotated about its rotational axis defined by the shaft 18, the cables 24 and 26 wrap and unwrap about the sector pulley 16 and since they are tensioned to place the slider means 20, and particularly the tube 40 thereof, in compression, there is absolutely no lost motion or backlash because the tension of the cables 24 and 26 require that the slider means 20 move precisely with, i.e., incrementally with the rotation of the sector pulley 16.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A rotary/linear motion converter assembly (10) of the type converting rotational motion to longitudinal motion for longitudinally moving a motion transmitting core element (14), and vice versa, to transmit motion, said assembly comprising; sector means (16) rotatable about a rotational axis, slider means (20) reciprocal along a reciprocation axis which is transverse to said rotational axis, housing means (22) for rotatably supporting said sector means (16) and for reciprocally supporting said slider means (20), tensioning means (24, 26) in tension between and interconnecting said sector means (16) and said slider means (20) to move said slider means (20) along said reciprocal axis in response to rotation of said sector means (16), and vice versa, for preventing lost motion between said sector means (16) and said slider means (20), first (28) and second (30) attachment means spaced along said reciprocation axis from one another, said tensioning means including a first cable (24) attached at a first end to said first attachment means (28) and a second cable (26) attached at a first end to said second attachment means (30) for placing said slider means (20) in compression between said first (28) and second (30) attachment means, said slider means (20) including a tubular member (40) having first and second ends, a guide means including a slot (106) extending longitudinally along said tubular member (40) and a guide member (108) supported by said housing (22) and extending into said slot (106) for preventing rotation of said slide means (20) about said reciprocation axis, said sector means (16) extending into said tubular member (40) through said slot (106), said first attachment means (28) being positioned at said first end of said slider means (20) and said second attachment means (30) being positioned at said second end of said slider means (20), said first attachment means (28) including adjustment means (42) for adjusting the tension in said first (24) and said second (26) cables and a first adapter (44) abutting said first end of said slider means (20) and a first terminal shaft (50) secured to said first end of said first cable (24) and extending through said first adapter (44), said adjustment means (42) including a threaded portion (52) on said terminal shaft (50) and at least one nut (54) threaded on said threaded portion (52) for reacting with said first adapter (44), said terminal shaft (50) including an irregularly shaped portion (56) coacting with said first adapter (44) for preventing rotation of said terminal shaft (50).

2. An assembly as set forth in claim 1 wherein said adjustment means (42) further includes biasing means (60) reacting between said first adapter (44) and said nut (54) for pretensioning said cables (24, 26) by urging said nut (54) away from said first adapter (44).

3. An assembly as set forth in claim 2 wherein said first adapter (44) abuts the first end of said tubular member (40), said second attachment means (30) includes a second adapter (30) abutting the second end of said tubular member (40), said first end of said second cable (26) being attached to said second adapter (30), said housing means (22) being adapted (75, 76) for connection to a core element casing (74) adjacent said second adapter (30).

4. An assembly as set forth in claim 3 including a closed end spent travel tube (78) removably connected (82) to said housing means (22) for receiving said first end of said slider means (20) during movement thereof.

5. An assembly as set forth in claim 4 wherein said first and second ends of said tubular member (40) each include a projection (46, 64) and said adapters (44, 30) each include a recess (48, 66) receiving one of the projections (46, 64) for preventing relative rotation between said adapters (44, 30) and said tubular member (40).

6. An assembly as set forth in claim 5 including a pair of spaced bearings (98) disposed in said housing means (22) and supporting said tubular member (40) for guiding the reciprocal movement thereof.

7. An assembly as set forth in claim 6 wherein said sector means (16) includes a shaft (18) rotatably supported (94) by said housing means (22) and extending therefrom to a distal end, and lever means (13) attached to said distal end for rotating said shaft (18).

8. An assembly as set forth in claim 7 wherein said housing means (22) includes a circular (86) portion surrounding said sector means (16) and a tubular portion (88) extending generally tangentially to said circular portion (86), said circular portion (86) being open on one side and cover (90) means closing said one side.

9. An assembly as set forth in claim 8 wherein said sector means (16) includes an arcuate periphery concentric with said rotational axis, said sector means (16) having a central portion along said arcuate periphery, said sector means (16) having a first attachment position (32) spaced along said periphery in one direction from said central portion and a second attachment position (34) spaced along said periphery in the opposite direction from said central portion, said first (24) and second (26) cables being flexible with the second end of said first cable (24) being attached to said sector means (16) at said first attachment position (32) and the second end of said second cable (26) being attached to said sector means (16) at said second attachment position (34).

10. An assembly as set forth in claim 9 wherein said second end of said slider means (20) includes core element attachment means (72) for connection to a motion transmitting core element (14).

11. An assembly as set forth in claim 10 wherein said sector means (16) includes first and second spaced and parallel grooves extending along said periphery between said first (32) and second (34) attachment positions, said first cable (24) being disposed in said first groove for wrapping and unwrapping engagement with said first groove in said sector means (16) during rotation of said sector means (16), said second cable (26) being disposed in said second groove for wrapping and unwrapping engagement with said second groove in said sector means (16) during rotation of said sector means (16).

12. An assembly as set forth in claim 1 wherein said second adapter (30) includes said core element attachment means (72).

* * * * *